(12) United States Patent
Takahashi et al.

(10) Patent No.: US 11,959,516 B2
(45) Date of Patent: Apr. 16, 2024

(54) HOLLOW SHAFT MEMBER AND ROLLING DEVICE

(71) Applicant: THK CO., LTD., Tokyo (JP)

(72) Inventors: Toru Takahashi, Tokyo (JP); Junzo Shimbe, Tokyo (JP); Hidetada Suzuki, Tokyo (JP)

(73) Assignee: THK CO., LTD., Tokyo (JP)

( * ) Notice: Subject to any disclaimer, the term of this patent is extended or adjusted under 35 U.S.C. 154(b) by 289 days.

(21) Appl. No.: 17/601,154

(22) PCT Filed: Mar. 10, 2020

(86) PCT No.: PCT/JP2020/010252
§ 371 (c)(1),
(2) Date: Oct. 4, 2021

(87) PCT Pub. No.: WO2020/203090
PCT Pub. Date: Oct. 8, 2020

(65) Prior Publication Data
US 2022/0178401 A1    Jun. 9, 2022

(30) Foreign Application Priority Data
Apr. 5, 2019   (JP) ................... 2019-072503

(51) Int. Cl.
*F16C 3/02*      (2006.01)
*B21D 41/04*      (2006.01)
(Continued)

(52) U.S. Cl.
CPC ............... *F16C 3/02* (2013.01); *B21D 41/04* (2013.01); *B21D 51/10* (2013.01); *B21D 53/10* (2013.01);
(Continued)

(58) Field of Classification Search
CPC .......... F16C 3/02; F16C 29/06; F16C 29/068; F16C 29/0683; F16C 29/0685;
(Continued)

(56) References Cited

U.S. PATENT DOCUMENTS

2016/0273575 A1*   9/2016   Morlock ................ B21K 1/063
2016/0312864 A1*   10/2016   Kishi ...................... F16H 55/26
(Continued)

FOREIGN PATENT DOCUMENTS

CN     102322480 A     1/2012
CN     105328096 A     2/2016
(Continued)

OTHER PUBLICATIONS

DE102010040017_Description.*
(Continued)

*Primary Examiner* — Phillip A Johnson
(74) *Attorney, Agent, or Firm* — WHDA, LLP

(57) ABSTRACT

This hollow shaft member 10 includes paired diameter-reduced sections 11 respectively formed at both shaft ends of a hollow shaft-like tubular material by performing swaging processing on both the shaft ends, and an intermediate section 12 located between the paired diameter-reduced sections, and having an outer diameter larger than an outer diameter of the paired diameter-reduced sections. Shapes of connection boundaries between the intermediate section 12 and the diameter-reduced sections 11 are formed as perpendicular step-shaped sections 13 stepped substantially perpendicular to an axial direction, and the perpendicular step-shaped sections 13 are formed by the swaging processing.

8 Claims, 8 Drawing Sheets

(51) Int. Cl.
  *B21D 51/10* (2006.01)
  *B21D 53/10* (2006.01)
  *F16C 29/06* (2006.01)

(52) U.S. Cl.
  CPC .......... *F16C 29/06* (2013.01); *F16C 2220/42* (2013.01); *F16C 2220/46* (2013.01)

(58) Field of Classification Search
  CPC .. F16C 2220/42; F16C 2220/46; F16H 25/22; F16H 25/2204; F16H 25/2247; B21D 41/04; B21D 51/10; B21D 53/10
  See application file for complete search history.

(56) References Cited

U.S. PATENT DOCUMENTS

| 2017/0314435 A1* | 11/2017 | Panther | F01N 1/083 |
| 2018/0056371 A1 | 3/2018 | Kuwahara et al. | |

FOREIGN PATENT DOCUMENTS

| CN | 106914581 A | 7/2017 | |
| DE | 102010012717 A1 * | 12/2010 | B21J 5/002 |
| DE | 102010040008 A1 * | 3/2012 | B21J 5/12 |
| DE | 102010040017 A1 * | 3/2012 | B21K 1/063 |
| JP | 57-90415 A | 6/1982 | |
| JP | 63-33534 A | 2/1988 | |
| JP | 6-63948 U | 9/1994 | |
| JP | 7-96342 A | 4/1995 | |
| JP | 2001-121241 A | 5/2001 | |
| JP | 2006-218513 A | 8/2006 | |
| JP | 2007-75824 A | 3/2007 | |
| JP | 2015-042413 A | 3/2015 | |
| TW | 201302341 A | 1/2013 | |
| WO | 2012/143668 A1 | 10/2012 | |

OTHER PUBLICATIONS

Office Action dated Oct. 18, 2022, issued in counterpart JP Application No. 2019-072503, with English Translation (8 pages).
Office Action dated Nov. 9, 2022, issued in counterpart TW Application No. 109109941. (7 pages).
International Search Report dated Jun. 2, 2020, issued in counterpart International Application No. PCT/JP2020/010252. (3 pages).
Office Action dated Jun. 28, 2022, issued in counterpart JP Application No. 2019-072503, with English Translation. (8 pages).
Office Action dated Dec. 28, 2022, issued in counterpart CN application No. 202080026089.2, with English translation. (11 pages).

* cited by examiner

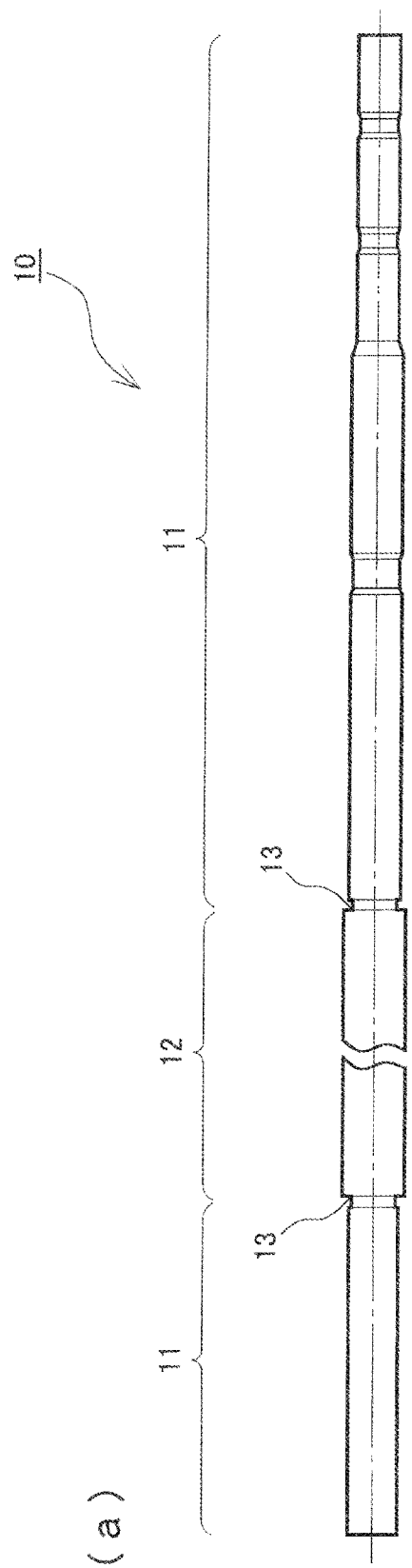
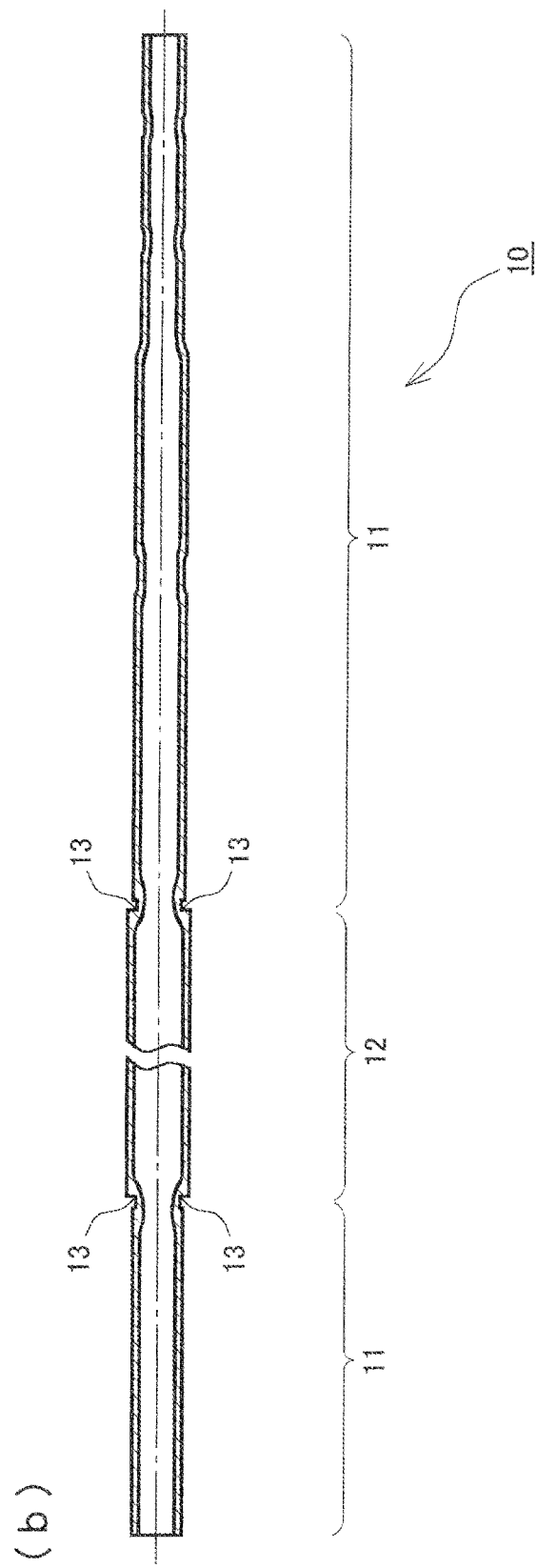
Fig.1(a)
Fig.1(b)

DETAILS OF PART C

DETAILS OF PART B

DETAILS OF PART A

DETAILS OF PART D

DETAILS OF PART E

HOLLOW SHAFT MEMBER AND ROLLING DEVICE

TECHNICAL FIELD

The present invention relates to a hollow shaft member and a rolling device including this hollow shaft member.

BACKGROUND ART

A rolling device known as a ball screw device or a ball spline device includes an inner member having a track face on an outer face and an outer member having a load track face opposite to the track face of the inner member and being located at the outside of the inner member. A plurality of rolling elements are interposed between the inner member and the outer member, and the outer member is movable relatively to the inner member. In this manner, a quick movement can be obtained in such a rolling device by the plurality of rolling elements interposed between the inner member and the outer member. The rolling device is thus used in various fields such as a robot, a machine tool, a medical instrument, and aircraft equipment.

A weight reduction of the rolling device is sought in order to use the rolling device in various fields. For example, an approach conventionally employed as a countermeasure for reducing the weight of the rolling device includes subjecting the rolling device to cutting processing to reduce and thin the thickness of the rolling device, to create holes, and the like. However, even when the rolling device is subjected to cutting processing, it is difficult to remarkably reduce the weight of the rolling device. In particular, since predetermined strength should be ensured for a shaft-like member such as a screw shaft or a spline shaft to be used as an inner member, it is difficult to reduce the weight.

Herein, as a prior art technique for reducing the weight of a shaft-like member, a hollow shaft-like tubular material has been subjected to deformation processing to reduce the weight while forming a desired contour shape. For example, Patent Literature 1 below discloses a method of manufacturing a hollow shaft by a process including a tapering step of tapering both ends of a pipe-like material and a sizing step of shaping a jaw portion into normal shape and dimensions. Patent Literature 2 below discloses a technology of manufacturing a hollow shaft by swaging processing or upset processing for providing a hollow shaft that enables a weight reduction, reduction in processing load, cost reduction, and the like.

CITATION LIST

Patent Literature

PATENT LITERATURE 1: Japanese Patent Laid-Open No. 2001-121241
PATENT LITERATURE 2: Japanese Patent Laid-Open No. 2007-75824

DISCLOSURE OF THE INVENTION

Problems to be Solved by the Invention

Inventors of the present invention obtained the idea of performing swaging processing on both shaft ends of a hollow shaft-like tubular material to manufacture a hollow shaft member such as a screw shaft or a spline shaft as an approach for achieving a weight reduction of the screw shaft or the spline shaft which is an inner member of a rolling device. However, in order to use the hollow shaft member for a screw shaft, a spline shaft, or the like for a rolling device, perpendicular step-shaped sections stepped substantially perpendicular to the axial direction need to be formed at both shaft ends of the hollow shaft member. This is because, in order to use the hollow shaft member for a screw shaft, a spline shaft, or the like for a rolling device, bearings for bearing the shaft need to be installed at both the shaft ends, and it is indispensable to form perpendicular step-shaped sections stepped substantially perpendicularly.

However, as described in Patent Literature 2 above, in the case of forming the contour shape of a hollow shaft by swaging processing, an inclined face inclined in a direction diagonal to the axial direction can only be formed as a processed shape, and it is very difficult to form perpendicular step-shaped sections stepped substantially perpendicularly. This is indicated by the fact that the contour shape of the hollow shaft illustrated in the drawings of Patent Literature 2 only includes an inclined face shape, and does not include a perpendicular step-shaped section.

Further, the "BACKGROUND ART" paragraph in Patent Literature 1 above describes content to the effect that "although a method of shaping the hollow shaft by rotary swaging processing using a pipe-like material is conceivable, this method is not suitable for targeting at a component having a sharp stepped portion", and it is publicly known in the technological common sense based on the prior art represented by Patent Literature 1 that it is extremely difficult to perform swaging processing on both shaft ends of a hollow shaft-like tubular material to manufacture a hollow shaft member such as a screw shaft or a spline shaft, in particular, to manufacture a hollow shaft member having a perpendicular step-shaped section by swaging processing.

The present invention proposes a technological approach for manufacturing a hollow shaft member having perpendicular step-shaped sections by swaging processing by inventing a novel invention that breaks through the above-described technological common sense of the prior art. An object of the present invention is to provide a hollow shaft member for a rolling device in which a weight reduction difficult to achieve with the prior art has been achieved by proposing the novel technological approach.

Means for Solving the Problems

A hollow shaft member according to the present invention includes: paired diameter-reduced sections respectively formed at both shaft ends of a hollow shaft-like tubular material by performing swaging processing on both the shaft ends; and an intermediate section located between the paired diameter-reduced sections, and having an outer diameter larger than an outer diameter of the paired diameter-reduced sections. Shapes of connection boundaries between the intermediate section and the diameter-reduced sections are formed as perpendicular step-shaped sections stepped substantially perpendicular to an axial direction, and the perpendicular step-shaped sections are formed by the swaging processing.

Effects of the Invention

According to the present invention, a hollow shaft member for a rolling device in which a weight reduction difficult to achieve with the prior art has been achieved can be provided.

BRIEF DESCRIPTION OF THE DRAWINGS

FIGS. 1A and 1B are includes diagrams illustrating a shape of a hollow shaft member according to the present embodiment, where FIG. 1(a) illustrates an external view, and FIG. 1(b) illustrates a sectional view.

FIG. 3(a) illustrates a material preparation (with annealing treatment already performed) step, FIG. 3(b) illustrates a rough processing step, FIG. 3(c) illustrates an intermediate processing step, and FIG. 3(d) illustrates a finish processing step.

FIG. 4(a) illustrates a conventional product in a solid state, FIG. 4(b) illustrates a conventional product reduced in weight by drilling, and FIG. 4(c) illustrates the inventive product having subjected to swaging processing.

MODE FOR CARRYING OUT THE INVENTION

Hereinafter, a preferred embodiment for carrying out the present invention will be described with reference to the drawings. Note that the embodiment below does not limit the invention according to each of claims. Further, all combinations of characteristics described in the embodiment are not essential for solving means of the invention.

First, a mode example of a hollow shaft member manufactured by the present invention will be described with reference to FIG. 1. Herein, FIG. 1 includes diagrams illustrating a shape of the hollow shaft member according to the present embodiment, where FIG. 1(a) illustrates an external view, and FIG. 1(b) illustrates a sectional view.

A hollow shaft member 10 according to the present embodiment is a member formed by subjecting both shaft ends of a hollow shaft-like tubular material to swaging processing. In other words, diameter-reduced sections 11 are formed respectively at both the shaft ends of the hollow shaft member 10. Moreover, an intermediate section 12 is formed between the paired diameter-reduced sections 11 formed at both the shaft ends. The intermediate section 12 has an outer diameter larger than an outer diameter of the paired diameter-reduced sections 11, and is a portion that may exert a function as an inner member of a rolling device, such as a screw shaft or a spline shaft, for example.

Moreover, perpendicular step-shaped sections 13 stepped substantially perpendicular to the axial direction are formed at connection boundaries between the intermediate section 12 and the paired diameter-reduced sections 11. The perpendicular step-shaped sections 13 are shapes formed for installing bearings for bearing the hollow shaft member 10 which is a shaft body, and by disposing the bearings at the places where the perpendicular step-shaped sections 13 are formed, the hollow shaft member 10 to be used as an inner member of a rolling device, such as a screw shaft or a spline shaft, for example, can be reliably attached to an installation place. Note that the paired diameter-reduced sections 11 and the perpendicular step-shaped sections 13 formed in the hollow shaft member 10 according to the present embodiment are formed by manufacturing steps through use of swaging processing invented by the inventors of the present invention. Thus, the manufacturing steps of the hollow shaft member 10 according to the present embodiment will be described next also with reference to FIG. 2 and FIG. 3.

Figure 2:
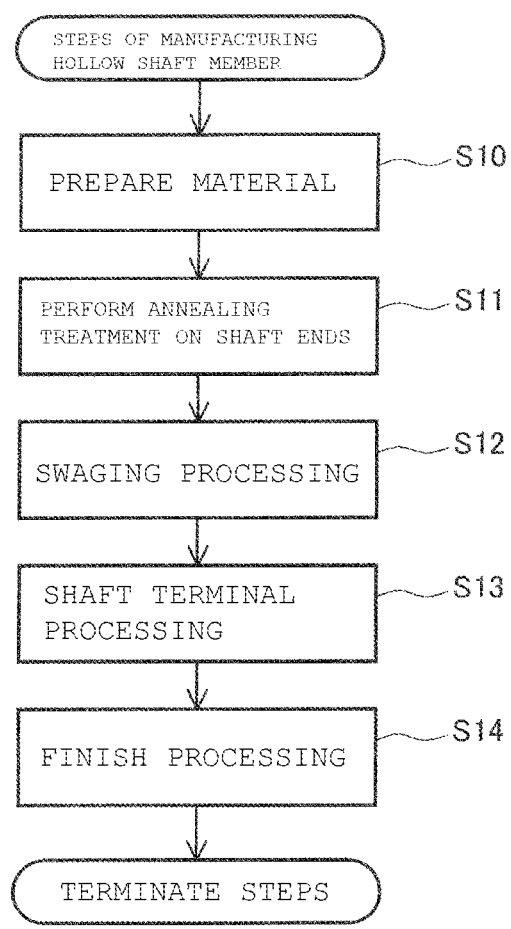
FIG. 2 is a flowchart for describing steps of manufacturing the hollow shaft member according to the present embodiment.

FIG. 2 is a flowchart for describing steps of manufacturing the hollow shaft member according to the present embodiment. Moreover, FIG. 3 includes diagrams illustrating an example of specific processing steps of swaging processing illustrated in FIG. 2.

As illustrated in FIG. 2, in the steps of manufacturing the hollow shaft member 10 according to the present embodiment, a hollow shaft-like tubular material is prepared first (step S10). This material is of a quality having high metal strength and hardness that can be used as an inner member of a rolling device, and bearing steel, high-carbon steel, or the like such as SUJ2, for example, is used. Then, processing of performing annealing treatment on the prepared tubular material to reduce the hardness of the tubular material to be subjected to swaging processing thereafter is executed (step S11).

Figure 3:
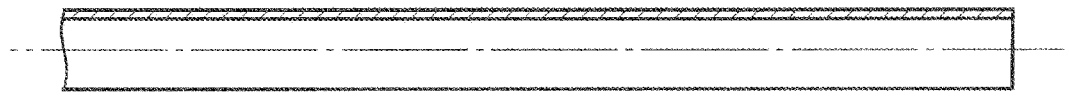
FIGS. 3A-3D are includes diagrams illustrating an example of specific processing steps of swaging processing illustrated in FIG. 2, where in particular.
Figure 3:
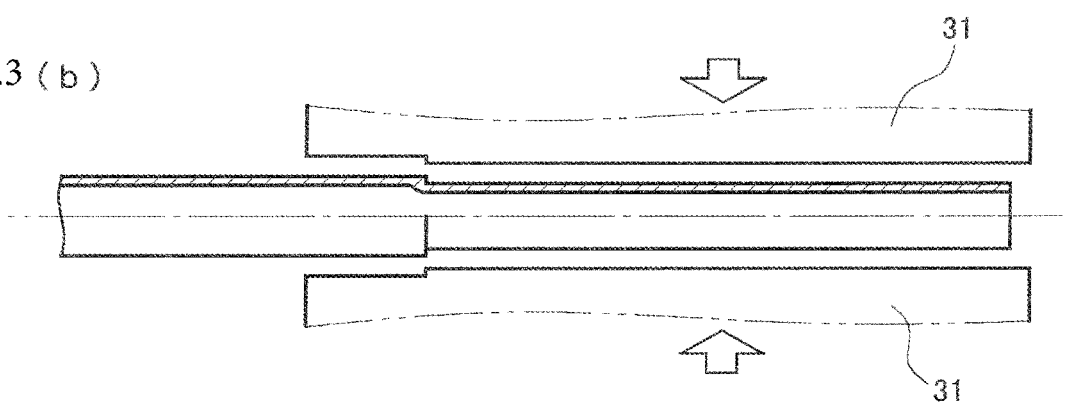
Figure 3:
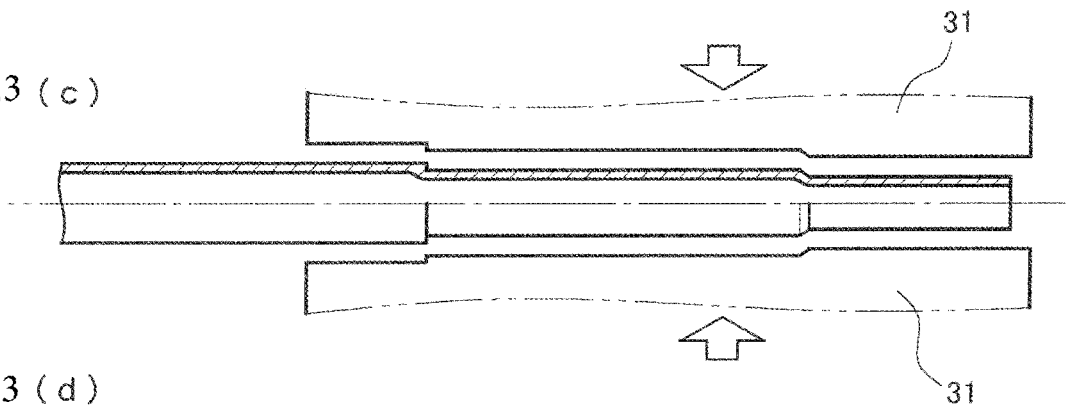
Figure 3:
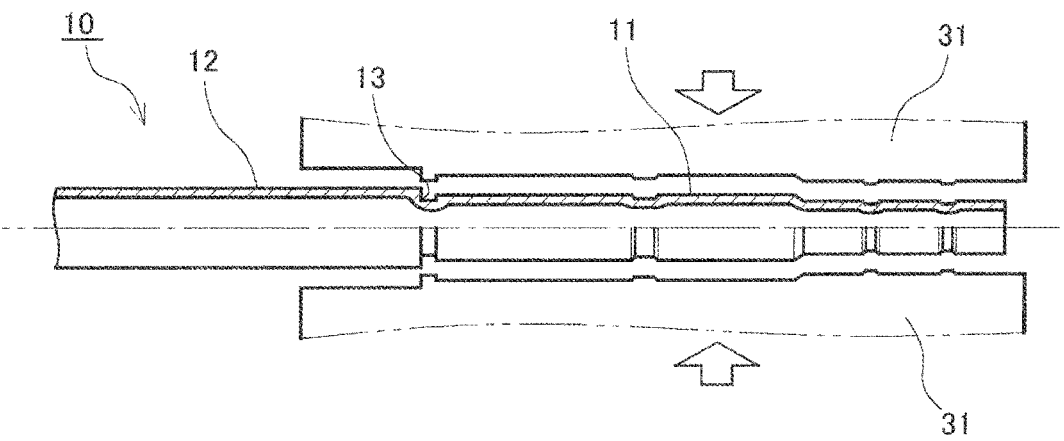

Subsequently, both the shaft ends of the tubular material having been subjected to annealing treatment are subjected to swaging processing to form the diameter-reduced sections 11 and the perpendicular step-shaped sections 13 (step S12). Note that the swaging processing is a processing method also called rotational cold-forging processing, and a divided tool called a die 31 is rotated to spread a base material while beating. When forming the paired diameter-reduced sections 11 and the perpendicular step-shaped sections 13 according to the present embodiment, an approach of dividing swaging processing into a plurality of processing steps such as "(a) material preparation→(b) rough processing→(c) intermediate processing→(d) finish processing" as illustrated in FIG. 3, for example, to gradually form a final shape may be employed, or an approach of forming a final shape at once in one processing step may be employed.

Note that the reason why the swaging processing in the present embodiment described above can be executed without problem is because processing of reducing the hardness of the material works effectively by executing the annealing treatment illustrated in step S11 at both the shaft ends of the tubular material before the swaging processing illustrated in step S12. Tests conducted by the inventors have confirmed that in a case of performing swaging processing without performing the annealing treatment illustrated in step S11, a failure such as a crack occurs in a product.

When the swaging processing illustrated in step S12 in FIG. 2 is terminated, a basic contour shape of the hollow shaft member 10 according to the present embodiment has been formed, and thereafter, shaft terminal processing (step S13) and finish processing (step S14) for completing the hollow shaft member 10 as a final product are executed, and the hollow shaft member 10 according to the present embodiment is completed.

Note that in a case of using the hollow shaft member 10 according to the present embodiment as an inner member of a rolling device, processing such as forming a track face on the intermediate section 12 and performing quenching processing to increase surface hardness needs to be performed.

In that case, for example, work processing of forming a track face in advance in a region to be the intermediate section 12 may be performed in the step of material preparation illustrated in step S10 in FIG. 2, and quenching processing may be executed in the step of finish processing illustrated in step S14. Moreover, the paired diameter-reduced sections 11 reduced in hardness by performing the annealing treatment illustrated in step S11 experience process curing by carrying out the swaging processing illustrated in step S12, and a slight increase in hardness can be expected, but quenching processing on the paired diameter-reduced sections 11 may be executed in the step of finish processing illustrated in step S14 in order to ensure the function as an inner member of a rolling device.

As described above, the paired diameter-reduced sections 11 and the perpendicular step-shaped sections 13 that form the hollow shaft member 10 according to the present embodiment can be suitably formed by a combination of annealing treatment (step S11) and swaging processing (step S12). Therefore, it can be confirmed that a metal flow has been formed by the swaging processing as observed by microscopic observation of metal tissues of sections of the paired diameter-reduced sections 11 and the perpendicular step-shaped sections 13. In other words, by observing the hollow shaft member 10 which is the final product at the micro level, it is possible to verify whether the manufacturing method of the present embodiment illustrated in FIG. 2 and FIG. 3 has been utilized.

Next, a result of performance comparison between the hollow shaft member 10 (inventive product) manufactured utilizing the manufacturing method of the present embodiment and a hollow shaft member (conventional product) of the prior art will be described with reference to FIG. 4 and Table 1. Herein, FIG. 4 includes sectional views illustrating shapes of the conventional product and the inventive product, where FIG. 4(*a*) illustrates a conventional product in a solid state, FIG. 4(*b*) illustrates a conventional product reduced in weight by drilling, and FIG. 4(*c*) illustrates the inventive product. Moreover, Table 1 is a table showing a result of performance comparison between the conventional product illustrated in FIG. 4(*b*) and the inventive product illustrated in FIG. 4(*c*), and shows a result of comparing mass and dangerous speed.

TABLE 1

| | ITEM | | CONVENTIONAL PRODUCT | INVENTIVE PRODUCT |
|---|---|---|---|---|
| MASS | OUTLINE | | SOLID | BASIC THICKNESS t = 2.15 mm (THICKNESS OF GROOVE BOTTOM: 0.7875 mm) |
| | CALCULATED VALUE | | 1.2 kg | 0.6 kg (50% OF THAT OF CONVENTIONAL PRODUCT) |
| DANGEROUS SPEED | CALCULATION FORMULA | | $N = \dfrac{60 \times \lambda_1}{2\pi \times l_b^2} \times \sqrt{\dfrac{E \times 10^3 \times I}{\gamma \times A}} \times 0.8$ | |
| | DISTANCE BETWEEN ATTACHMENTS | $l_b$ | 900 mm | |
| | COEFFICIENT OF ATTACHING METHOD | $\lambda_1$ | 4.73 | |
| | YOUNG'S MODULUS | E | $2.06 \times 10^5$ N/mm$^2$ | |
| | DENSITY | $\gamma$ | $7.85 \times 10^{-6}$ kg/mm$^3$ | |
| | SECOND MOMENT OF SCREW SHAFT AREA | I | ABOUT 1230 mm$^4$ | ABOUT 1700 mm$^4$ |
| | SECTIONAL AREA OF SCREW SHAFT | A | ABOUT 125 mm$^2$ | ABOUT 80 mm$^2$ |
| | DANGEROUS SPEED (ALLOWABLE ROTATION NUMBER) | N | ABOUT 3400 min$^{-1}$ | ABOUT 5000 min$^{-1}$ (1.5 TIMES THAT OF CONVENTIONAL PRODUCT) |

Figure 4A:
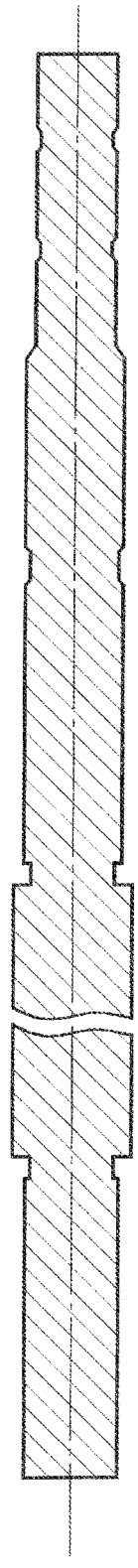
FIGS. 4A-4C are includes sectional views illustrating shapes of a conventional product and an inventive product, where
Figure 4B:
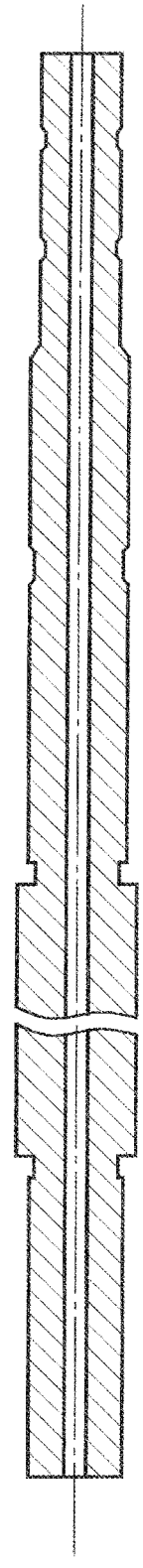
Figure 4C:
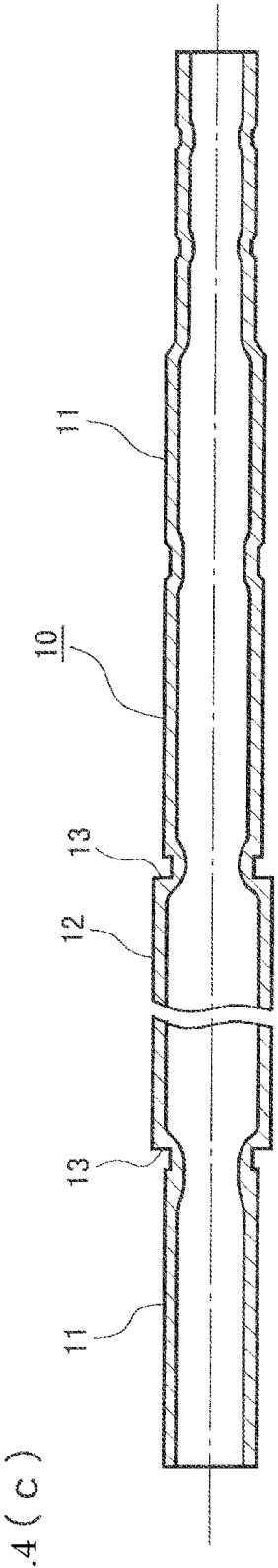

As illustrated in FIG. 4, hollow shaft members of the same steel type having the same length are employed for the conventional product and the inventive product subjected to performance comparison. Note that the conventional product has a hole formed in the axial direction by drilling for reducing the weight. On the other hand, the inventive product has a contour shape formed by subjecting the hollow shaft-like tubular material to swaging processing, and thus, the inner cavity also has a cavity shape in line with the contour shape.

As shown in Table 1 above, in terms of "mass", the conventional product is 1.2 kg, while the inventive product is 0.6 kg, which is even 50% of the weight of the prior art. Although being hollow shaft members of the same steel type having the same length, the inventive product has achieved a weight reduction of 50% as compared with the prior art. On the other hand, when comparing "dangerous speed (allowable rotation number)" in order to evaluate the functional aspect as an inner member of a rolling device, the conventional product presents a value of about 3400 min$^{-1}$, and the inventive product presents a value of about 5000 min$^{-1}$. In other words, the inventive product has an allowable rotation number about 1.5 times that of the conventional product, and it has been confirmed that the inventive product is superior to the conventional product also for a performance index of "dangerous speed (allowable rotation number)" in terms of safety and strength aspects. Such verification results have revealed that the hollow shaft member 10 (inventive product) manufactured utilizing the manufacturing method of the present embodiment can achieve a weight reduction difficult to achieve with the prior art.

Moreover, the reason why such an effect that the present inventive product can have a lighter weight than the conventional product is obtained is because a space along the inner diameter of the intermediate section 12 positioned at the shaft central part can be formed in the present inventive product, while in the conventional product, a through-hole can be made in the shaft only within a range of the inner diameter of the paired diameter-reduced sections positioned at both the shaft ends. In other words, in the hollow shaft member 10 according to the present embodiment, the inner diameter of the intermediate section 12 can be made larger than the inner diameter of the paired diameter-reduced sections 11, and achievement of such a mode enables a weight reducing effect greater than in the prior art to be obtained.

Next, a specific example of the hollow shaft member 10 manufactured utilizing the manufacturing method of the present embodiment described above will be given with reference to FIG. 5 and FIG. 6. Herein, FIG. 5 is a diagram illustrating a specific example of the hollow shaft member according to the present embodiment, and FIG. 6 is a diagram illustrating another specific example of the hollow shaft member according to the present embodiment.

Figure 5:
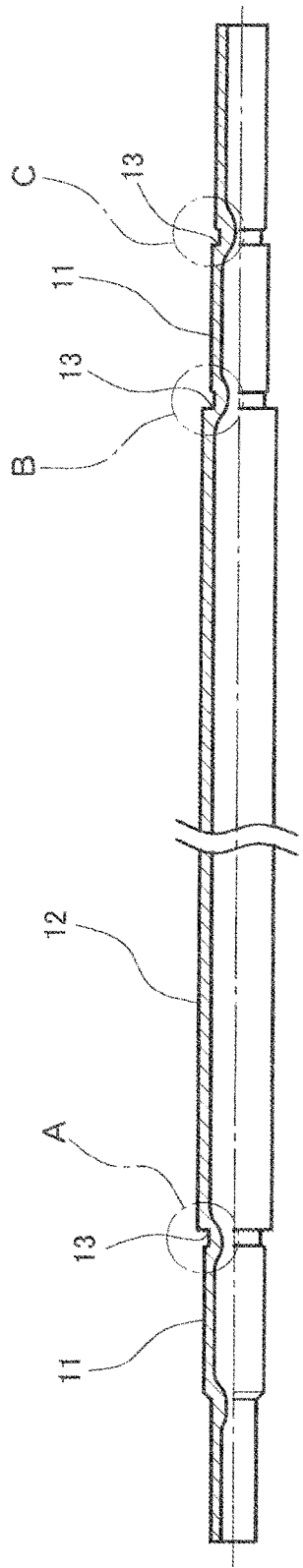
FIG. 5 is a diagram illustrating a specific example of the hollow shaft member according to the present embodiment.
Figure 5:
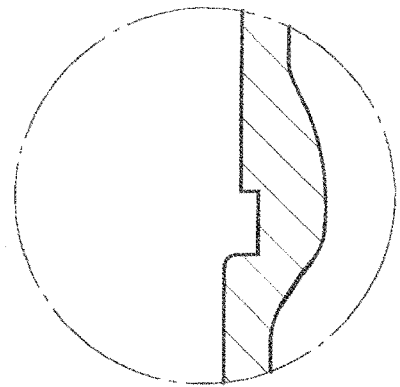
Figure 5:
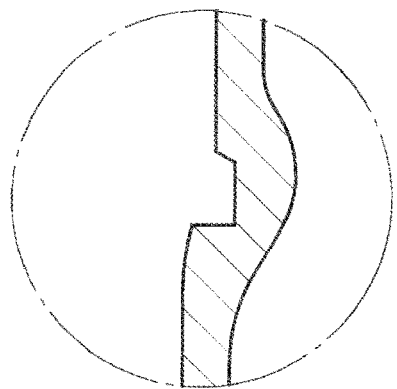
Figure 5:
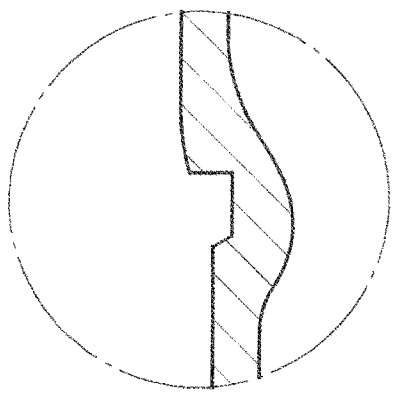

FIG. 5 illustrates a specific example where processing including annealing treatment (step S11) and swaging processing (step S12) has been executed for a material having an outer diameter of about φ 5 mm and a plate thickness of about 0.8 mm, for example, and the paired diameter-reduced sections 11 and three perpendicular step-shaped sections 13 indicated by characters A, B, and C have been formed. The hollow shaft member 10 illustrated in FIG. 5 is formed of QPD5 (equivalent to SUS 440C), and can be used as a spline shaft by forming a spline groove in the intermediate section 12, for example.

Figure 6:
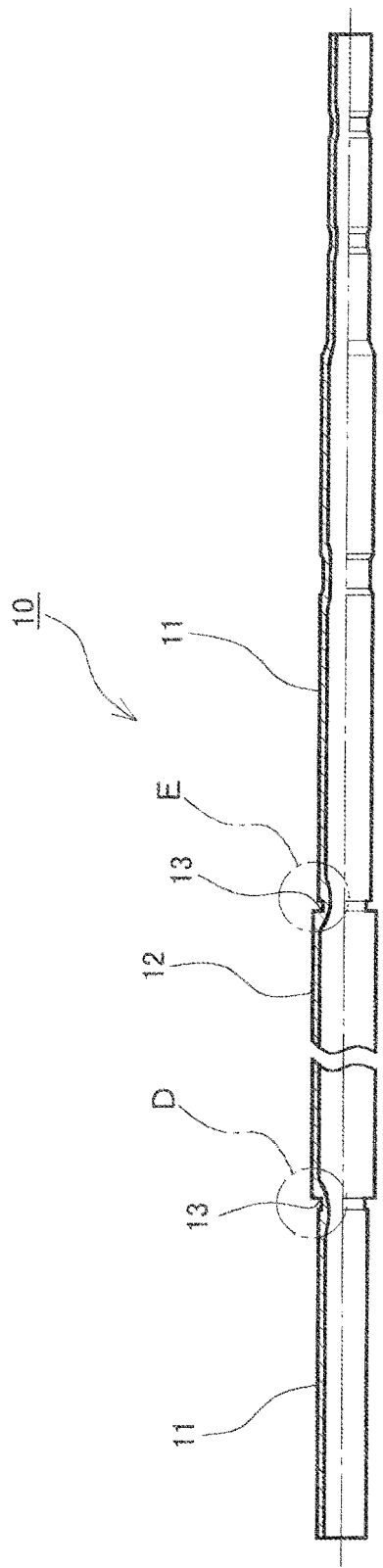
FIG. 6 is a diagram illustrating another specific example of the hollow shaft member according to the present embodiment.
Figure 6:
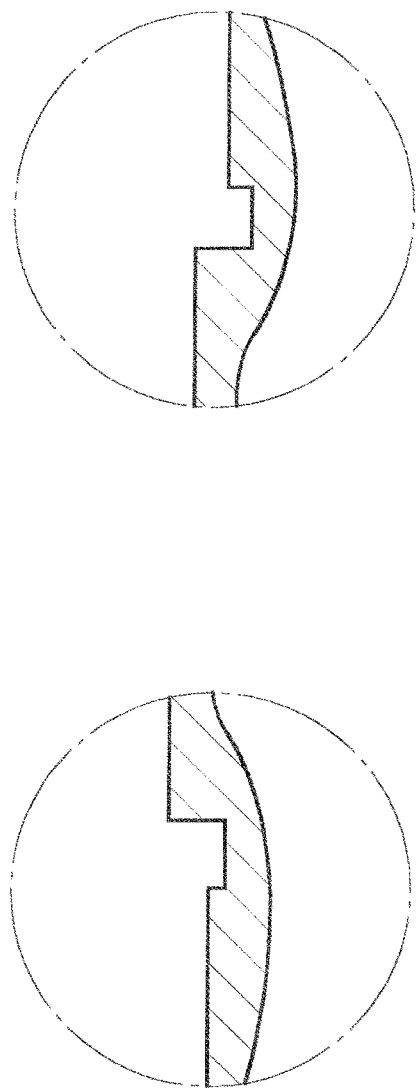

Moreover, FIG. 6 illustrates a specific example where processing including annealing treatment (step S11) and swaging processing (step S12) has been executed for a material having an outer diameter of about φ 15 mm and a plate thickness of about 2.15 mm, for example, and the paired diameter-reduced sections 11 and two perpendicular step-shaped sections 13 indicated by characters D and E have been formed. The hollow shaft member 10 illustrated in FIG. 6 is formed of high-carbon steel, and can be used as a screw shaft by forming a screw groove in the intermediate section 12, for example.

Further, in the case of the specific example in FIG. 6, it is understood that the inner peripheral face of the intermediate section 12 and the outer peripheral face of the diameter-reduced sections 11 are at substantially the same level in the axial direction with the position at which the perpendicular step-shaped sections 13 are formed serving as boundaries. Therefore, it is indicated that the perpendicular step-shaped sections 13 can be formed until a condition where an inequality:

Plate thickness t ≤ processed deformation dimension L holds is obtained, where the plate thickness of the material is t and a processed deformation dimension of the step formed by swaging processing is L. Note that as a specific processing result in which it has been confirmed that the above inequality holds, a result value for a ball spline that the plate thickness t=0.5 mm<the processed deformation dimension L=0.525 mm (an outer diameter of φ 4.2 mm processed into φ 3.15 mm) and a result value for a precision ball screw that the plate thickness t=2.15 mm<the processed deformation dimension L=2.5 mm (an outer diameter of φ 15.3 mm processed into φ 10.3 mm) have been confirmed by the inventors.

The specific configuration of the hollow shaft member 10 according to the present embodiment and the manufacturing steps thereof have been described above. It is particularly suitable to use the hollow shaft member 10 of the present embodiment as an inner member constituting a rolling device. Thus, an example in a case of applying the hollow shaft member 10 of the present embodiment to a rolling element screw device and a spline device will be described with reference to FIG. 7 and FIG. 8.

(Application Example to Rolling Element Screw Device)

Figure 7:
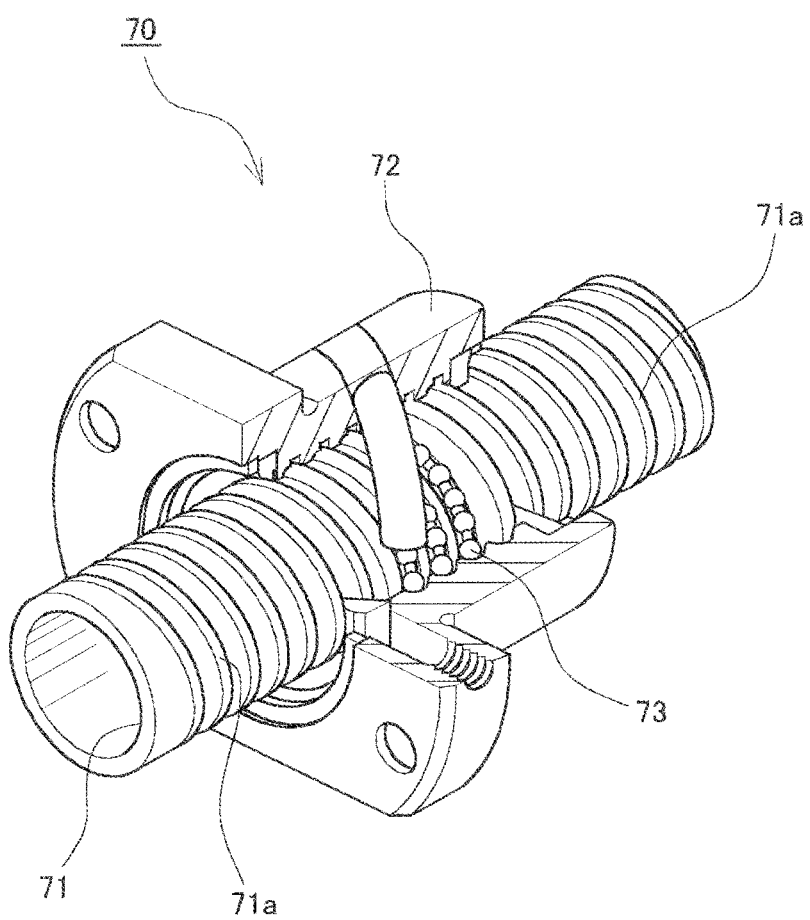
FIG. 7 is a diagram exemplifying a case where the hollow shaft member according to the present embodiment is configured as a screw shaft of a ball screw device.

The hollow shaft member 10 according to the present embodiment can be configured as a screw shaft 71 of a ball screw device 70 as illustrated in FIG. 7, for example. FIG. 7 is a diagram exemplifying a case where the hollow shaft member according to the present embodiment is configured as a screw shaft of a ball screw device. Such a ball screw device 70 is a device including the screw shaft 71 serving as an inner member, and a nut member 72 serving as an outer member to be attached to this screw shaft 71 with the interposition of a plurality of balls 73 in a relatively rotatable manner.

The screw shaft 71 is an inner member having a rolling element rolling groove 71*a* serving as a spiral track face formed on an outer peripheral face, and the nut member 72 is an outer member having a load rolling groove serving as a spiral track face formed on an inner peripheral face to correspond to the rolling element rolling groove 71*a*. In accordance with the relative rotational movement of the screw shaft 71 with respect to the nut member 72, the nut member 72 is relatively movable in a reciprocating manner with respect to the screw shaft 71.

Then, the screw shaft 71 constituting the ball screw device 70 can be formed by the hollow shaft member 10 according to the present embodiment including the paired diameter-reduced sections 11 and the perpendicular step-shaped sections 13 formed by the combination of the annealing treatment (step S11) and swaging processing (step S12) described above. At this time, by forming the rolling element rolling groove 71*a* serving as the spiral track face on the outer peripheral face of the intermediate section 12 of the hollow shaft member 10 according to the present embodiment, the hollow shaft member 10 according to the present embodiment can function as the screw shaft 71. By employing such a configuration, the hollow shaft member 10 for the ball screw device 70 in which a weight reduction difficult to achieve with the prior art has been achieved can be provided.

(Application Example to Spline Device)

Figure 8:
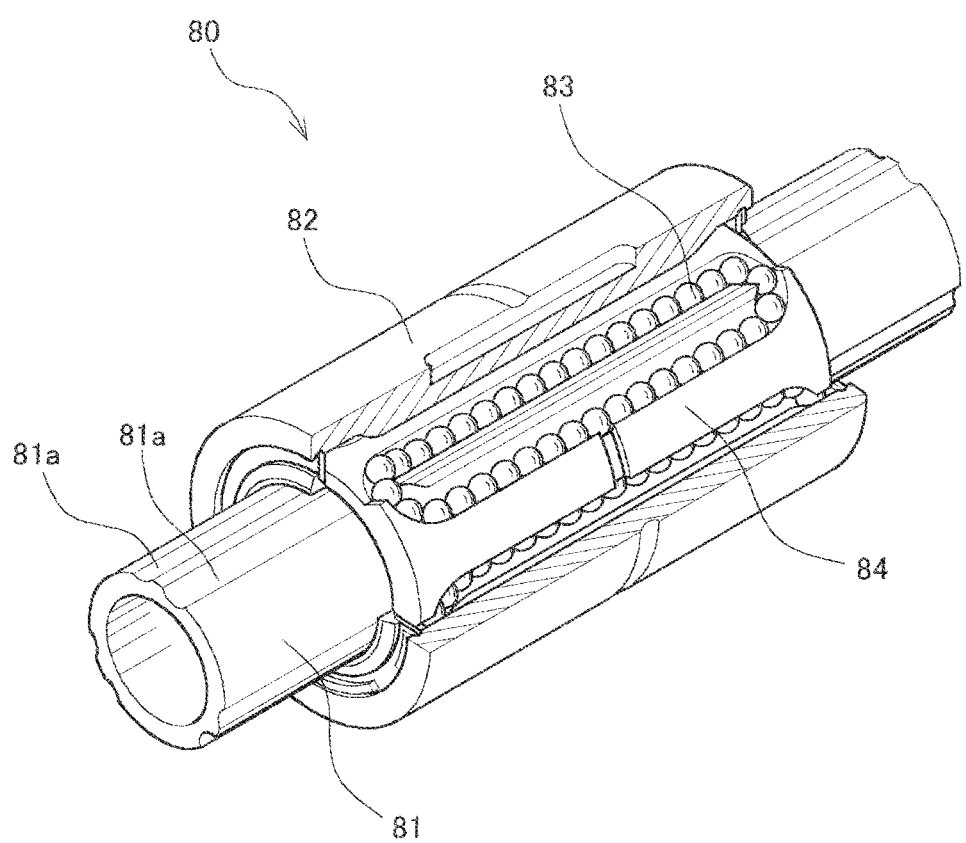
FIG. 8 is a diagram exemplifying a case where the hollow shaft member according to the present embodiment is configured as a spline shaft of a spline device.

Further, the hollow shaft member 10 according to the present embodiment can be configured as a spline shaft 81 of a spline device 80 as illustrated in FIG. 8, for example. FIG. 8 is a diagram exemplifying a case where the hollow shaft member according to the present embodiment is configured as a spline shaft of a spline device.

Herein, a configuration of the spline device 80 illustrated in FIG. 8 will be simply described. The spline device 80 includes the spline shaft 81 serving as an inner member, and a cylindrical outer cylinder 82 serving as an outer member attached movably to the spline shaft 81 with the interposition of balls 83 serving as a plurality of rolling elements. A rolling element rolling face 81*a* serving as a track face to serve as a track of the balls 83 and extending in the axis line direction of the spline shaft 81 is formed in a surface of the spline shaft 81. A load rolling element rolling face serving as a track face corresponding to the rolling element rolling face 81*a* is formed in the outer cylinder 82 attached to the spline shaft 81. A load rolling path is formed between the load rolling element rolling face formed in the outer cylinder 82 and the rolling element rolling face 81*a* formed in the spline shaft 81. A non-load return path along which the balls 83 released from a load move is formed in the vicinity of the load rolling path. A retainer 84 that aligns and retains the plurality of balls 83 in a circuit shape is assembled to the outer cylinder 82. Then, when the plurality of balls 83 are installed between the load rolling element rolling face of the outer cylinder 82 and the rolling element rolling face 81a of the spline shaft 81 in a rollable manner, and are installed to be circulated endlessly through the non-load return path, the outer cylinder 82 is relatively movable in a reciprocating manner with respect to the spline shaft 81.

Then, even in the case of the spline device 80 illustrated in FIG. 8, the spline shaft 81 constituting the spline device 80 can be formed by the hollow shaft member 10 according to the present embodiment including the paired diameter-reduced sections 11 and the perpendicular step-shaped sections 13 formed by the combination of the annealing treatment (step S11) and swaging processing (step S12) described above. At this time, by forming the rolling element rolling face 81a serving as the track face in the outer peripheral face of the intermediate section 12 of the hollow shaft member 10 according to the present embodiment, the hollow shaft member 10 according to the present embodiment can function as the spline shaft 81. By employing such a configuration, the hollow shaft member 10 for the spline device 80 in which a weight reduction difficult to achieve with the prior art has been achieved can be provided.

While a preferred embodiment of the present invention has been described, the technical scope of the present invention is not limited to the scope of the above-described embodiment. Various modifications or improvements of the above-described embodiment can be made. It is obvious that embodiments obtained by making such modifications or improvements may also be included in the technical scope of the present invention from the description of claims.

REFERENCE NUMERALS

10 Hollow shaft member (inventive product, inner member), 11 Diameter-reduced section, 12 Intermediate section, 13 Perpendicular step-shaped section, 31 Die, 70 Ball screw device (rolling device), 71 Screw shaft (inner member), 71a Rolling element rolling groove (track face), 72 Nut member (outer member), 73 Ball (rolling element), 80 Spline device (rolling device), 81 Spline shaft (inner member), 81a Rolling element rolling face (track face), 82 Outer cylinder (outer member), 83 Ball (rolling element), 84 Retainer.

The invention claimed is:

1. A hollow shaft member comprising:
paired diameter-reduced sections respectively formed at both shaft ends of a hollow shaft tubular material by performing swaging processing on both the shaft ends; and
an intermediate section located between the paired diameter-reduced sections, and having an outer diameter larger than an outer diameter of the paired diameter-reduced sections, wherein
shapes of connection boundaries between the intermediate section and the diameter-reduced sections are formed as perpendicular step-shaped sections stepped substantially perpendicular to an axial direction, and the perpendicular step-shaped sections include a groove-shaped recess, wherein external dimensions of the perpendicular step-shaped sections are smaller than the external dimensions of the pair of diameter-reduced sections, and a bearing is capable of being installed on the perpendicular step-shaped sections to support the hollow shaft member and the perpendicular step-shaped sections are formed by the swaging processing.

2. The hollow shaft member according to claim 1, wherein the paired diameter-reduced sections and the perpendicular step-shaped sections are formed by the swaging processing executed after performing annealing treatment at both the shaft ends of the hollow shaft-like tubular material.

3. The hollow shaft member according to claim 2, wherein an inner diameter of the intermediate section is larger than an inner diameter of the paired diameter-reduced sections.

4. The hollow shaft member according to claim 1, wherein an inner diameter of the intermediate section is larger than an inner diameter of the paired diameter-reduced sections.

5. A rolling device comprising:
paired diameter-reduced sections respectively formed at both shaft ends of a hollow shaft tubular material by performing swaging processing on both the shaft ends; and
an intermediate section located between the paired diameter-reduced sections, and having an outer diameter larger than an outer diameter of the paired diameter-reduced sections, wherein
shapes of connection boundaries between the intermediate section and the diameter-reduced sections are formed as perpendicular step-shaped sections stepped substantially perpendicular to an axial direction, and the perpendicular step-shaped sections are formed by the swaging processing,
in which the hollow shaft member is used as an inner member, an outer face of the intermediate section included in the hollow shaft member being provided with a track face formed therein, the rolling device comprising:
an outer member having a track face opposite to the track face of the inner member; and
a plurality of rolling elements disposed between both the track faces in a rollable manner, wherein
the rolling device is produced with the outer member being assembled to an outer side of the inner member with an interposition of the plurality of rolling elements.

6. The rolling device according to claim 5, wherein the paired diameter-reduced sections and the perpendicular step-shaped sections are formed by the swaging processing executed after performing annealing treatment at both the shaft ends of the hollow shaft-like tubular material.

7. The rolling device according to claim 6, wherein an inner diameter of the intermediate section is larger than an inner diameter of the paired diameter-reduced sections.

8. The rolling device according to claim 5, wherein an inner diameter of the intermediate section is larger than an inner diameter of the paired diameter-reduced sections.

* * * * *